Nov. 14, 1950     H. CHIREIX     2,530,287
AERIAL NAVIGATION
Filed April 17, 1947     3 Sheets-Sheet 1
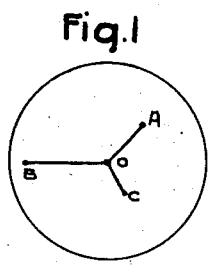
Fig.1
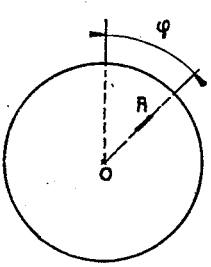
Fig.6
GROUND DISPOSITION OF BEACONS
①• ②• ③• ①• ②• ③•
④• ⑤• ⑥• ④• ⑤• ⑥•
⑦• ⑧• ⑨• ⑦• ⑧• ⑨•
①• ②• ③• ①• ②• ③•
④• ⑤• ⑥• ④• ⑤• ⑥•
⑦• ⑧• ⑨• ⑦• ⑧• ⑨•
Fig.2
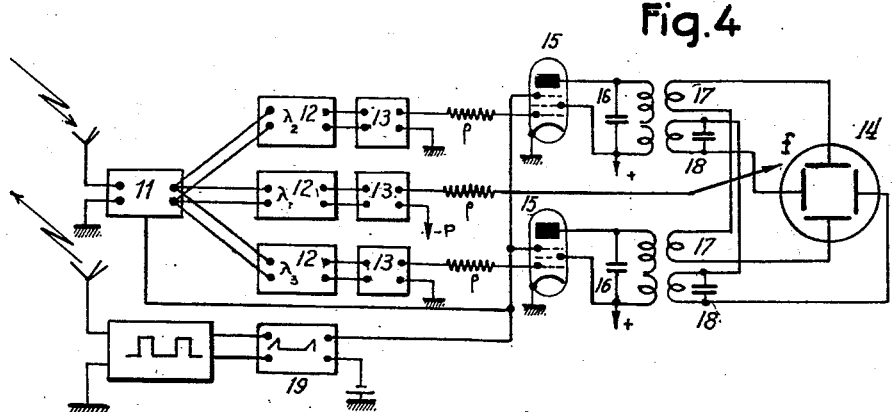
Fig.4
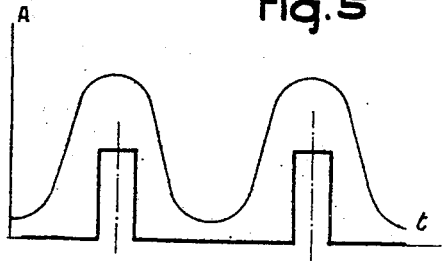
Fig.5
Inventor
HENRI CHIREIX
By Haseltine, Lake & Co.
Agents Nov. 14, 1950  H. CHIREIX  2,530,287
AERIAL NAVIGATION
Filed April 17, 1947  3 Sheets-Sheet 2
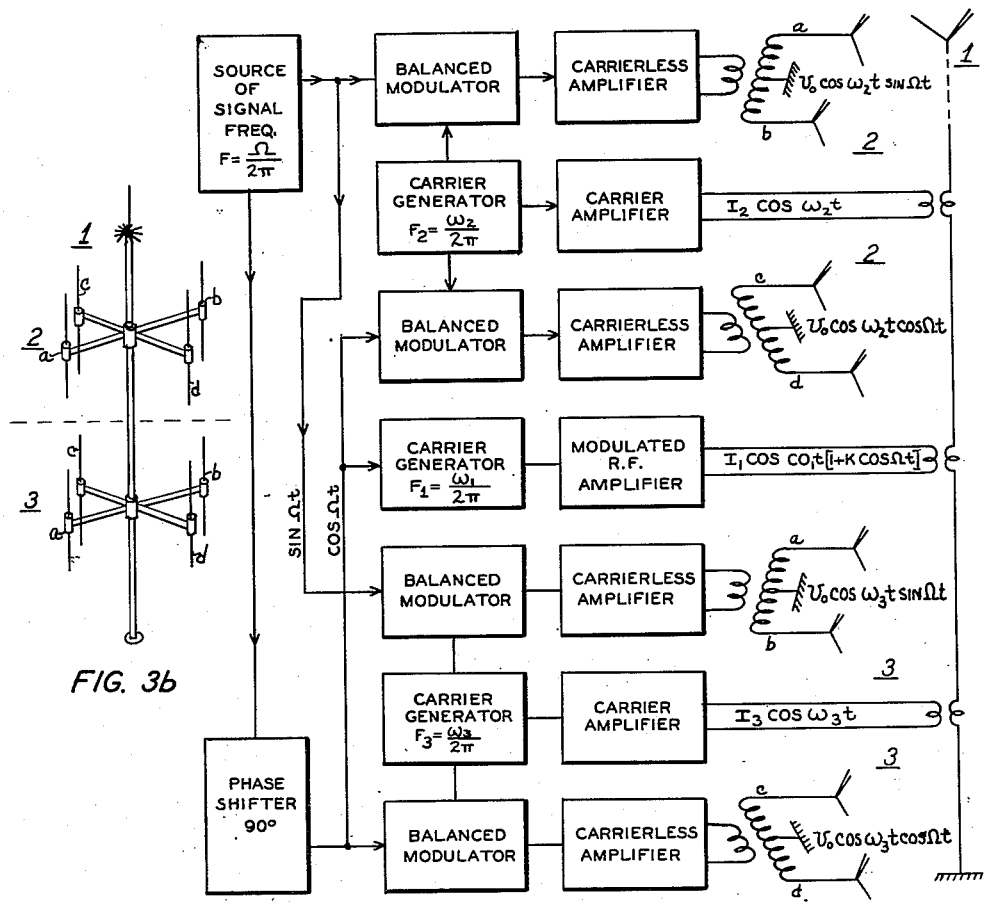
FIG. 3b
FIG. 3a
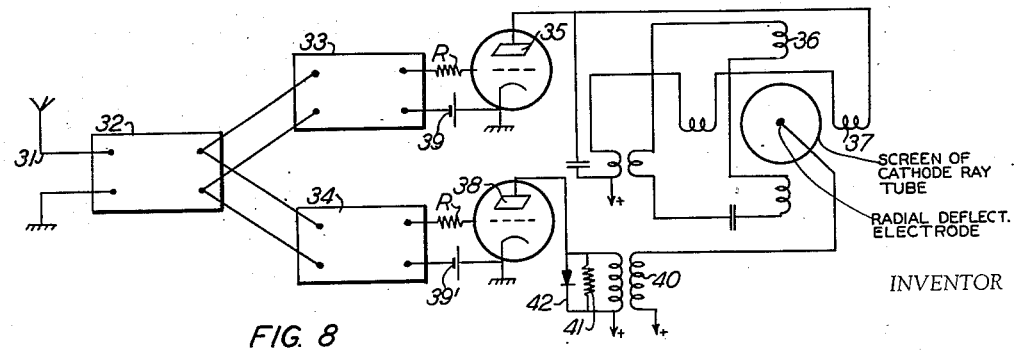
FIG. 8
INVENTOR
HENRI CHIREIX
BY *Haseltine Lake & Co*
AGENTS

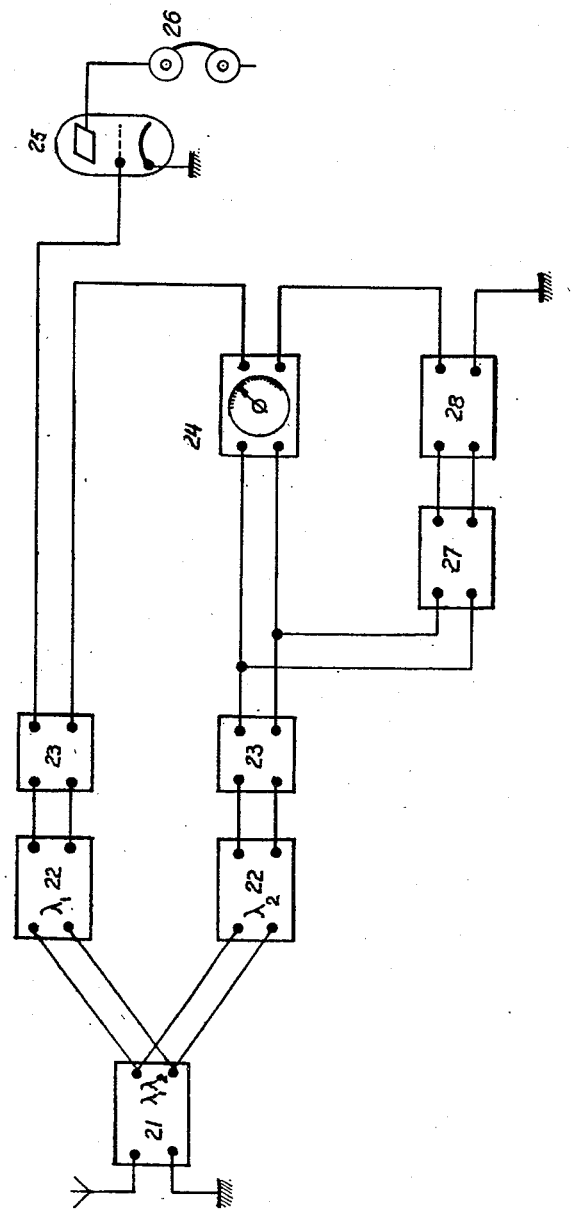

Patented Nov. 14, 1950

2,530,287

UNITED STATES PATENT OFFICE 2,530,287

AERIAL NAVIGATION

Henri Chireix, Paris, France, assignor to Société Francaise Radio Electrique, a corporation of France Application April 17, 1947, Serial No. 742,086
In France May 5, 1944

Section 1, Public Law 690, August 8, 1946
Patent expires May 5, 1964

8 Claims. (Cl. 343—16)

The present invention is especially, but not exclusively, applicable to aerial navigation. Its chief object is to obtain on board, a mobile craft, and particularly an aircraft, on the screen of a cathode ray oscillograph, and in the most improved aspect of the invention, not only the simultaneous indication of the direction of radio beacons installed on the ground, but also the distance of said beacons from the aircraft. It is, in fact, proposed to obtain on said screen, an image such as that shown in Figure 1, the length of the half-lines OA, OB, OC indicating the distance from the aircraft to the transmitters A, B, C located on the ground, the direction of the half-lines directly giving the true bearing of the aircraft with respect to said transmitters.

An essential characteristic of the invention is that on board the aircraft, the reception of all the necessary information from which may be obtained the true bearing of the transmitters A, B, C, etc. can be effected by means of a single stationary aerial, which may be a simple vertical aerial, i. e. a system which has no directional effect in the horizontal plane. This necessarily implies that the information is supplied by the radio beacons installed on the ground. The installation on board the aircraft is thus considerably simplified, and the errors, which might be caused by the directive reception on board the aircraft of very short waves, of which the use is contemplated, are eliminated, and also the necessity of combining the indications obtained by goniometry with the radio-compass, in order to determine the true bearing.

The invention will be better understood from the description below given of some embodiments of the invention taken in connection with the accompanying drawings wherein:

Figure 1 shows an indication on the screen of a cathode ray tube as obtained in the operation of the invention;

Figure 2 shows schematically the distribution of the radio beacons in a territory being served;

Figures 3a and 3b show a non-limitative example of a scheme of a radio beacon according to the invention;

Figure 4 shows a circuit diagram of a non-limitative example of a receiver according to the invention;

Figure 5 shows two variants of the signals utilized;

Figure 6 shows another indication on the screen of a cathode ray tube; and

Figures 7 and 8 show simplified diagrams of modifications of the receivers.

The arrangement according to the invention will first be described in the case in which it is proposed to obtain on board the aircraft, the simultaneous indication of the direction of the radio beacons on the ground without indication of the distance, and a description will then be given of the additional installations to be made in the case in which it is desired to add the indication of the distances.

In the first case contemplated, the installation on board the aircraft is reduced to a receiver associated with the aerial and to a cathode ray oscillograph associated with the receiver. In the second case, the installation on board should be completed by a transmitter transmitting short impulses.

The ground installation comprises, according to Figure 2, special radio beacons, the operation of which will be described, and all of which operate on the same wavelength, preferably on short waves. Said radio beacons are, for instance, located at an average distance of 150 kilometres from one another. However, they do not all transmit simultaneously; for instance, only the radio beacons designated by 1, transmit simultaneously, then those designated by 2, and so forth, up to those designated by 9, then starting again by those designated by 1. This result can be obtained, for example, in the following way:

All the transmitters of the territory operating on the same wave length are supplied with power from a three-phase 50-cycle supply system or inter-connected supply systems. The control device for the transmission is connected to a synchronous distributor. In this manner, each radio beacon is set in action, for instance 50 times per second for periods of $\frac{1}{450}$ of a second. These radio beacons are, furthermore, keyed at a slower cadence so as to transmit a call sign which characterises them. By means of this arrangement errors of bearing, which might be caused by the simultaneous reception of several radio beacons operating on the same wavelength, are avoided.

The construction of one of these radio beacons, all of which are similar, will now be described. A radio beacon (Figure 3) comprises in reality three transmitters operating on wavelengths which are very close together; $\lambda_1$ corresponding to the frequency $\omega_1$, $\lambda_2$ corresponding to the frequency $\omega_2$, $\lambda_3$ corresponding to the frequency $\omega_3$. Said transmitters are all modulated at the same frequency $\Omega$.

The first of said transmitters (Figure 3) has two output terminals and supplies, through a feeder, on the wavelength $\lambda_1$, the vertical aerial I. The maximum amplitude of the current flowing through said aerial is expressed by:

$$I_1 = I_0 \cos \omega_1 t [1 + K \cos \Omega t]$$

K being the percentage of the modulation. At a given distance, $d$, from said aerial the electric field which it produces is of the form:

(1) $\quad E_1 \cos \omega_1 t [1 + K \cos \Omega t]$ conditionally on changing the time origin so as to take into account the time of propagation corresponding to this distance.

The second of said transmitters is separated from the third by suitable insulating devices and has three pairs of output terminals; the first pair of terminals supplies, in phase opposition, the aerials $a$ and $b$ of an aerial system II of the Adcock fixed type, the second pair of terminals supplies, in phase opposition, the aerials $c$ and $d$ of this same aerial system II. The four aerials, $a$, $b$, $c$, $d$, are arranged along the edges of a square base prism having a length of side which is small compared to the wavelength. The first of the pairs of output terminals supplies a voltage of the form.

$$U_1 = U_0 \cos \omega_2 t \sin \Omega t$$

whereas the second pair of terminals supplies a voltage of the form:

$$U_2 = U_0 \cos \omega_2 t \cos \Omega t$$

In other words, the amplitude of the high frequency signal at frequency $\omega_2$ is sinusoidally modulated, at the frequency $\Omega$, by two identical modulating groups, the modulations being in quadrature of phase. The electric field of such a system, at the same given distance as hereinbefore, equals:

$$E \cos W_2 t (\cos \Omega t \cos \varphi + \sin \Omega t \sin \varphi)$$

the time $t$ being reckoned from the same origin as in the Expression 1, and the angle $\varphi$, which is the bearing of the place of reception with respect to the transmitter, being reckoned from the plane containing the aerials $c$ and $d$, in the direction of rotation of the field. Finally, the third pair of terminals (Figure 3) injects in the aerial I a current of the form:

$$I_2 \cos \omega_2 t$$

i. e. an unmodulated current. It follows that the field, at the given distance, on the wavelength $\lambda_2$, can be expressed by:

(2) $\quad E_2 \cos \omega_2 t [1 + \mu \cos (\Omega t - \varphi)]$ in which $\mu$ designates the ratio of the field supplied by the aerial system II on $\lambda_2$, to the field supplied by the aerial system I likewise on $\lambda_2$.

The third of said transmitters (Figure 3) which supplies the aerial system III and the aerial system I, is in all respects similar to the second, but the supply connections of $c$, $d$ are reversed in III relatively to what they were in II, so as to obtain, at the given distance, a field of the form:

(3) $\quad E_3 \cos \omega_3 t [1 - \mu' \cos (\Omega t + \varphi)]$ in which $\mu'$ designates a similar ratio to $\mu$.

By way of a non-limitative example, and still in the case in which it is not contemplated to indicate the distance, the modulation frequency $\Omega$ could be an audio frequency of the order of a few kilocycles so that the total frequency band covered may be comparatively small.

The airborne installation, which is shown diagrammatically in Figure 4, will now be described.

The voltages induced in the aerial by the various fields (1), (2), (3) are fed to the high frequency portion 11 of a receiver where they are amplified together and optionally subjected to change of frequency; the three waves corresponding to $\lambda_1$, $\lambda_2$, $\lambda_3$ are then separated in filters 12 and then separately detected by the detectors 13.

Conditionally on the times of transmission being the same for the three adjacent wavelengths, a condition which can be readily obtained, in view of the three contiguous waves to be received having fixed frequencies, three detected voltages are obtained which are of the form:

(4) $\quad -B \cos \Omega t$ for $\lambda_1$
(5) $\quad A \cos(\Omega t - \varphi)$ for $\lambda_2$
(6) $\quad -A \cos(\Omega t + \varphi)$ for $\lambda_3$ $\varphi$ being the bearing with respect to the radio beacon considered. By means of these three voltages, it is possible to operate the cathode ray oscillograph 14, of which only the deflecting plates for the beam have been shown, and the control of luminosity by acting on the Wehnelt cathode has been indicated by an arrow $f$.

The detected voltages $\lambda_2$ and $\lambda_3$ are fed to two limiters formed by two pentodes 15 whose outputs are connected to circuits 16 tuned to the pulsation $\Omega$. For this purpose, a resistance, $\rho$ of high value, relative to the corresponding grid-cathode resistance, is inserted in the grid circuit. From the voltages produced in the circuits 16, there is created, in each of the groups coupled to the circuits 16, two equal voltages in phase opposition, one obtained by coupling an untuned circuit 17, the other a tuned circuit 18, these two voltages being combined as shown in Figure 4. Without any other contrivance, therefore, when the bearing varies, a diametrical line would be obtained which would rotate 360° when the angle $\varphi$ varies from 0 to 180°, and there would be an ambiguity of 180°.

On the other hand, by controlling the Wehnelt cathode by means of the voltage $-\cos \Omega t$ transmitted by $\lambda_1$, the cathode ray can be extinguished over a half diameter, since whatever be the value of $\varphi$, the radial deflection of the spot is in phase with $-\cos \Omega t$.

It will be immediately understood that by way of a variant, it is possible, instead of emitting always on the wave length $\lambda_1$ during $1/450$ second, not to emit on this wave length except during comparatively short impulses transmitted at the frequency F and having their axes as shown in Figure 5. As said impulses control the illumination of the Wehnelt cathode of the oscillograph, only the end of the half-diameter will be illuminated, so that the diagram will finally be that of Figure 6.

In view of the fact that owing to the arrangements made, geometrically adjacent radio beacons do not transmit simultaneously, the airborne installation will successively give the bearings of the various radio beacons located in the region, and as the bearings of each of them are taken, in the example in question, 50 times per second, there will be produced, owing to the persistence of retinal impressions, the impression of a continuous bearing being given.

The modifications and additions which have to be made to the installations above described in order to obtain, in addition to the foregoing indications, those of the distances, will now be described.

The airborne installation is completed by the addition of a small impulse transmitter also operating on short waves, but on a different wavelength. Said transmitter transmits via the antenna on the aircraft short impulses of a few milliseconds' duration for instance, at a cadence which is slightly different from the cadence or from a multiple of the cadence corresponding to the periods of transmission of the ground radio beacons. If, for instance, the setting in operation of said beacons is controlled by the 50 cycle supply system and takes place every 20 milliseconds, the impulses can be transmitted every 22 milliseconds or every 12 milliseconds, i. e. at a slightly slower cadence than 50 or 100 per second. It will be seen that, contrary to the usual technique, the impulses are transmitted at a very slow cadence; it obviously follows that the average power of the transmitter is very low.

Said impulses start, on board, the operation of a generator of saw-tooth voltages which are proportional to the time, which generator is designated by 19 in Figure 4; the time corresponding to the increase of the voltage is assumed to be equal to the time taken to travel by electromagnetic waves to and from the extreme range which has been allotted to the installation. Thus, if the extreme range is 150 kilometres for instance, said time is 1 millisecond.

The saw-tooth voltage is fed, on the one hand to the high frequency portion of the receiver so as to control the sensitivity thereof in the sense of an increase of the sensitivity as from the transmission of an impulse, and, on the other hand to the rejection grids of the pentodes 15 which are negatively biased when in the inoperative state. There is thus created a limitation threshold of the limiters 15 such that the limitation value increases linearly with the time as from the transmission of an impulse. It follows that the amplitude of the fields produced in the oscilloscope by the receipt of the signals of wavelengths $\lambda_2$, $\lambda_3$ also increase linearly with the time, and the same applies to the radial deflection.

On the ground, the installation of each radio beacon is completed by the addition of a receiver which receives the transmissions from the aircraft during the pulses transmitted by the synchronous distributor at fifty cycles per second, on the wavelength $\lambda_1$, which transmission itself controls the illumination of the cathode ray tube at the receiving end.

Of course, in this case, in which the indications of distance are obtained, it is necessary to give the frequency $\Omega$ a much higher value than in the first case described in which it was not contemplated to give the distance. The frequency $\Omega$ should be chosen equal to a few hundred kilocycles so that the duration of the illumination of the screen covers at least several cycles of said frequency. This involves a stricter differentiation of the three waves $\lambda_1$, $\lambda_2$, $\lambda_3$; it is nevertheless possible to accommodate all these transmissions so as only to cover a total frequency band of a few megacycles, i. e. a frequency band which is smaller than or equal to that of a normal television station.

As regards the operation at the receiving end, this is effected as follows (Figure 4). As the wavelengths $\lambda_2$ and $\lambda_3$ are radiated, during 2.2 milliseconds every 20 milliseconds (independently of the call sign of the station which modulates the transmission at a much slower cadence); the cathode ray of the cathode ray oscillograph 4 is subjected to the fields set up by the voltages produced in the circuits 16; furthermore, by the effect of the saw-tooth voltages of the generator 19, increase of amplitude of these fields with respect to a predetermined value varies linearly with the duration of each tooth of saw-tooth wave. The instants when this saw-tooth commences is after the instant which corresponds to the generation of the pulse since there is interposed a delay line between the output of the airborne transmitter and the time base generator to take account of the delay in transmission of the central antenna 1 until the waves leaving the aircraft reach the emitting station. Nevertheless, no spot is visible on the screen so long as the Wehnelt cathode is blocked. This blockage is removed by the signal transmitted by the antenna 1 of the transmitter. The Wehnelt cathode will therefore only operate for a particular value of the amplitude of the fields, which value is in direct relation with the time passed since the transmission of the impulse from the aircraft, i. e. with the distance of the aircraft from the transmitter. Therefore, in the case in which the pulse provided by the aircraft is not released later than the pulse provided by the beacon, the diagram of Figure 1 will be obtained.

It will be observed that the transmission on $\lambda_1$ only takes place by the effect of the impulses received and only during the transmitting periods of the radio beacons. If these transmitting periods are, as in the example chosen, 2.2 milliseconds every 20 milliseconds, and if the impulses transmitted from the aircraft follow one another every 12 milliseconds, only one impulse out of 5 will operate the radio beacon, since $5 \times 12 = 60$, other impulses arrive at instants when said beacon is inoperative. The Wehnelt cathode of the oscillograph will therefore be illuminated 16 to 17 times per second, since $1.000/60 = 16.66$, which is sufficient to produce, owing to the persistence of retinal impression, enhanced if necessary by the remanence of the fluorescence of the screen, the impression of a mark (Figure 6) or of a continuous half-line (Figure 1).

The case will now be considered in which several aircraft are flying over the same region. It is first of all normal that the operation of the pulse transmitter on each aircraft should not be continuous, the navigator only requiring to use it when he wishes to have the "map" of the region over which he is flying. This manner of operating offers moreover the advantage that the oscillograph 4 of Figure 4 can be used for the remainder of the time for other purposes. It is possible, in particular, as known, to group on said oscillograph the indications of other instruments on board the aircraft, such as artificial horizon, gyrocompass, air-speed indicator, blind approach indicator, etc. If however two aircraft transmit pulses simultaneously, there is a risk of the second aircraft producing the untimely starting of the transmission on $\lambda_1$ and therefore the illumination of the cathode ray tube aboard the first aircraft. It is necessary to examine this risk, still in the case of the example chosen. For this purpose, it will be observed that:

1. The second aircraft, just like the first, is only capable of starting the transmission on $\lambda_1$ 16 or 17 times per second.

2. For a "map" extending over 150 kilometres, the saw-tooth voltage of the generator 19 of Figure 4 lasts 1 millisecond and is repeated about 83 times per second. During more than 98% of the time, the oscilloscope aboard the first aircraft is blocked.

3. If, however, the two aircraft emit pulses simultaneously in the course of a period of operation of the beacon under consideration, the second aircraft, called the jammer illuminates the screen of the oscilloscope of the first aircraft while the cathode ray beam of the latter oscilloscope executes its diametral sweep; but the luminous marks thus started will have no consistency. In fact, if the cadence of the impulses on the disturbing aircraft is very slightly different from that of the disturbed aircraft (12.01 milliseconds for instance between the impulses instead of 12 milliseconds), which is obviously exact synchronism, only one impulse out of 10 would be capable of starting the transmission on $\lambda_1$; the second impulse which would start it having a lag of 100 microseconds with respect to the period when it should arrive in order to mark the same point on the screen of the oscillograph; it would therefore make a transient mark 15 kilometres further on, and so forth. All these transient marks, which are distributed haphazard along a line forming an angle $\varphi$ with the origin axis, will not in practice hinder the reading since the wanted mark corresponding to the desired bearing will be much more luminous owing to the fact that it is produced by the accumulation, at the same point, of the successive impulses transmitted.

Finally, it is obvious that the disturbance which is capable of being caused by the jamming aircraft will in no way upset the accuracy of the bearing indicated.

Although the installation according to the invention has just been described in its most complete form (indications of bearing and of distance), it may, the most often, be carried out in the simpler form of an indication of a bearing only. It will be observed, in fact, that if the pairs of aerials c, d of Figure 3 is for instance turned in the north-south direction, the origin of the phases $\varphi$ may be the south and for an aircraft located to the north of a first radio beacon A, the spot of the oscillograph of Figure 4 will mark a radius directed vertically downwards (according to Figure 1, i. e. with sinusoidal modulation of $\lambda_1$). This same aircraft flying to the south-east, for instance, of a second radio beacon B, i. e. the bearing having rotated 135°, for instance, in a clockwise direction, the oscillograph will mark a radius directed towards the north-west, and so forth. It is possible in this case to contemplate juxtaposing the image of the fluorescent screen on that of a geographical map directed in such a manner as to make the two north directions coincide, for instance by projecting the image of the screen on the map. It will then only be necessary to shift the projection and the map relatively to one another, first sideways so as to bring the place A of the map on to the line OA, and then in the direction of said line until the place B of the map comes on to the line OB, in order to see directly opposite O the place over which the aircraft is flying. This manner of operating, although less direct, avoids the use of a transmitter on board the aircraft and, as hereinbefore stated, reduces the necessary band width and the modulation frequency F.

It will be observed that, in the case in which it is only desired to indicate the bearing, the cadence at which the various radio beacons on the ground are set in action may be considerably smaller than has been indicated. Thus, for instance, said radio beacons could be set in action only every tenth of a second during a maximum time of 10 milliseconds. The mark of the radii OA, OB, OC (Figure 1) would then be seen on the oscillograph ten times per second, which is still sufficient. This enables the modulation frequency F to be further reduced.

Another arrangement according to the invention will now be described, which gives less complete indications, but which requires a simpler apparatus and consequently less expensive apparatus on board the aircraft. It is possible, for instance, to equip touring aircraft in this manner, the previously described equipment being reserved for larger aircraft. According to this modification, it is possible, without an oscillograph on board, to find the bearing of any of the radio beacons installed on the ground, the bearing being given in an auditive manner. Figure 7 shows diagrammatically the airborne receiver according to this modification.

Said receiver comprises first a high frequency portion 21 amplifying as a whole (optionally with change of frequency) the waves $\lambda_1$ and $\lambda_2$, or $\lambda_1$ and $\lambda_3$. Said waves are selected at 22 and are detected at 23. There are thus obtained, at the output terminals of the said detectors 23, voltages of the form $\cos \Omega t$ and $\cos (\Omega t - \varphi)$, $\varphi$ being the bearing required. One of these two voltages, for instance $\cos (\Omega t - \varphi)$, is fed to a manually operable dephasing circuit 24. At the output terminals of the dephasing device, said voltage is opposed to the second of the two voltages, and after optional amplification by the valve 25, the resulting voltage is fed to the telephone 26. For equal amplitudes of the two voltages, the resulting voltage is of the form:

$$\cos (\Omega t - \varphi + \theta) - \cos \Omega t = 2 \cdot \sin\left(\Omega t + \frac{\theta - \varphi}{2}\right) \cdot \sin\left(\frac{\theta - \varphi}{2}\right)$$

$\theta$ designating the advance introduced in the dephasing device 24. The resulting voltage therefore cancels out for $\theta = \varphi$, and increases linearly with $\theta$ for small values of $(\theta - \varphi)$, thus giving great sensitivity to the measurement. For unequal amplitudes, the zero is converted into a definite minimum owing to the increase of $$\sin\left(\frac{\theta - \varphi}{2}\right)$$

on either side of the minimum.

One has in effect: $A \cos (\Omega t - \varphi + \theta) - B \cos \Omega t = (A - B) \cos \Omega t - \varphi + \theta + B \cos (\Omega t - \varphi + \theta) - B \cos \Omega t$.

For $\varphi = \theta$ the last terms on the right cancel each other.

There is also no indefiniteness when $\varphi$ varies from 0 to 360°. The operating dial of the dephasing member 24 may therefore be directly graduated in bearings, said dial indicating the true bearing of the station involved.

It will nevertheless be noticed that this arrangement is incomplete when the aircraft receives the signals of several radio beacons, said beacons transmitting successively, owing to the fact that the adjustment of the dephasing device is not the same for the various stations. In order to obviate this drawback, provision is made for the signals received and already detected on one of the channels for obtaining the frequency $\Omega$, to be detected again at 27 and for the voltage thus obtained to synchronize an impulse generator 28 ensuring the operation of the valve 25. In fact, in each example chosen, according to which the radio beacons transmits successively every tenth of a second during a hundredth of a second, there will be received at the output terminals of 27, if several radio beacons are received one after the other, successive signals of more or less great amplitude according to whether the radio beacons are more or less distant, the cycle of the amplitude being repeated every tenth of a second. If, therefore, the impulse generator 28 is designed to produce impulses of one hundredth of a second at the cadence of ten per second, or better at a slightly different cadence, said generator can be synchronized by the impulses obtained from 27. It follows that the telephone will only be connected to a single predetermined radio beacon.

It is always possible to arrange for the generator 28 only to be synchronised with the transmitter producing the strongest impulses, thus only permitting the bearing of the strongest station to be taken; it is also possible to arrange for the generator 28 to be synchronised with any station. This result will precisely be obtained if the actual frequency of the generator 28 differs little from that of the transmission of the radio beacons; the generator 28 will be synchronised with any one of the radio beacon transmissions, according to the instant which has been chosen to set it in operation.

In the variants previously described, as the three waves transmitted $\lambda_1$, $\lambda_2$, $\lambda_3$ are very close together and have to be selected by filtering, it is generally necessary for the receiver to be of the superheterodyne type, the heterodyne being itself piloted by a quartz crystal of which the frequency is multiplied.

According to another object of the invention, the airborne receiver is simplified by causing the radio beacons to transmit directly, in addition to the above mentioned waves, a pure continuous wave on a frequency equal to that of the heterodyne. This wave, which is obtained from a quartz oscillator, may also be transmitted by the aerial I of the system of aerials. The receiver will in this case be identical to that of Figure 4, save as regards the input portion which will no longer include a frequency changer, the various intermediate frequencies being obtained direct by interference in the first detector, between the three grouped waves and the wave of the heterodyne frequency, which wave is itself transmitted by the ground radio beacon.

According to another object of the invention, the transmitter is furthermore simplified, and also the receiver, by eliminating the transmission on $\lambda_3$ of the radio beacons and the corresponding channel of the receiver. In this case, therefore, a group of waves will finally be transmitted which produces, at a distance, a complex field of the form:

$$E_0 \cos \omega_0 t + E_1 \cos \omega_1 t [1 + K \cos \Omega t] + E_2 \cos \omega_2 t [1 + \mu \cos(\Omega t - \varphi)]$$

$E_0$ and $\omega_0$ respectively designating the amplitude and the pulsation of the field which is intended to act as a heterodyne at the receiving end. It will be observed that such a transmission may be considered as a transmission which is modulated at the intermediate frequencies of:

$$\frac{\omega_1 - \omega_0}{2\pi} = \frac{\Omega_1}{2\pi} \text{ and } \frac{\omega_2 - \omega_0}{2\pi} = \frac{\Omega_2}{2\pi}$$

and in which the upper side band has been suppressed.

The receiver modified according to the foregoing principle will now be described. Said receiver (Figure 8) is only intended to give the bearing and to operate in relation with a cathode ray oscillograph provided with magnetic deflection for instance, which may furthermore have a conical electrode in order to obtain radial deflection electrostatically.

The receiver, which is fed by an aerial 31 (Figure 8), feeds the block 32 comprising a very high frequency amplifier followed by a single detector. The intermediate frequencies at the output of said detector are then amplified, selected and separately detected in the blocks 33 and 34, which are consequently amplifiers which are each tuned to one of the two intermediate pulsations $\Omega_1$ and $\Omega_2$. At the output of these blocks are again present the voltages $\cos 2\pi Ft$ and $\cos (2\pi Ft - \varphi)$, of which it is necessary to measure the difference of phase. For this purpose, the block 33 feeds an amplifying valve 35 which can also act as a limiter owing to the high resistance R inserted in its grid circuit. Said valve feeds a group of two circuits which are tuned to the frequency F and are magnetically coupled. The inductances 36 and 37 are formed by the magnetic deflection orthogonal deflecting coils of the oscillograph. As is well known, a rotating field is thus produced, so that the spot of the oscillograph describes a circular path at the frequency F. The diameter of the circle is limited by the limitation introduced by the valve 35.

Similarly, the block 34 feeds the limiting valve 38 which is so biassed by means of the battery 39' that the flow of anode current is just cut off. The anode circuit of said valve contains a very high frequency transformer 40 which is damped by the resistance 41 and the detector 42. The operation, which is moreover well known, of this arrangement, is as follows:

So long as the instantaneous alternating voltage supplied by the block 34 is added to that of the battery 39' and keeps the grid negative, the valve 38 is blocked. When the alternating voltage changes sign by passing through zero, the anode current begins to flow through the valve 38 and quickly reaches saturation point. The circuit comprising 40, 41, 42 is then energised by shock, and sets up a short voltage impulse of which the sign is such that the detector 42, as it is shown connected, remains inoperative (negative direction towards the anode). As known, the resistance 41 is of such a value that it brings the circuit near the point of critical aperiodicity, so that there is only a peak of voltage.

When the alternating voltage again becomes zero after a half-cycle, the voltage peak of opposite polarity is prevented from passing by the presence of the detector 42. A short voltage peak is thus obtained at each cycle of alternating current, said peak moreover coinciding with the instant when the alternating voltage passes through zero.

According to the characteristic of the invention, this brief impulse, which can be obtained from the secondary terminals of the transformer 40, is used to control the conical electrode of radial deflection of the oscillograph, if said oscillograph is provided with one, or else to illuminate the spot of the oscillograph by acting on the Wehnelt cathode. In the first case, a radius directed along the bearings is obtained, and in the second a luminous point on the circle of which the other points are dark, said point being likewise directed along the required bearing.

If the aircraft is flying over a region located in the zone of range of several radio beacons, the same operating successively as hereinbefore mentioned, the simultaneous bearing of all these radio beacons is obtained, in the above explained form, on the oscillograph.

It may be more advantageous, in particular in the case in which it is desired not to complicate the airborne installation with an oscillograph (case of Figure 7), to make the radio beacons which are in the same region operate on adjacent but different wavelengths; there will be, for instance, according to the arrangement of Figure 2, nine adjacent wavelengths. The intermediate pulsations $\Omega_1$, $\Omega_2$ and also the frequency F, will be the same for all the radio beacons. The difficulties of synchronisation on the ground will thus be eliminated, and only one call sign per region will be required.

The receiver of Figure 8 should in this case be completed by a tuning device on the high frequency portion 32 of the receiver. This device may, for instance, comprise a contact arm rotating quickly over studs, or a condenser of which the capacity can be varied in jumps and which is driven sufficiently fast for each of the nine frequencies to be explored several times per second. The image seen on the oscillograph is thus not changed, but it is possible, if the rotating member is stopped on a predetermined tuning, to identify a radio beacon of a region by its wavelength, since there will only be on the screen the radio beacon corresponding to this wavelength.

Although this method of operation slightly complicates the receiver previously described, it simplifies on the other hand the receiver of Figure 7 (which relates to a zero method), since the elements 27 and 28 are eliminated from the receiver, which elements were intended to isolate the reception of the radio beacon, on which it was desired to make the zero measurement, from the other radio beacons. It is, in fact, only necessary for there to be provided on said receiver a tuning adjustment to any of the nine frequencies considered.

I claim:

1. In a system for the guidance of mobile craft, a plurality of similar radio beacons located each at a pretermined geographic location, means for controlling said plurality of beacons to emit periodic signals in a predetermined relative order, each of said beacons comprising a source for transmitting signals comprising a first carrier, said first carrier being amplitude modulated with a first modulating wave, the phase of said first modulating wave having a constant value at a fixed range from said source for all bearings from said source, each of said beacons further comprising means for transmitting two further carriers, said further carriers being each amplitude modulated in predetermined relative phase with a further modulating wave, the frequencies of said further modulating waves being equal to the frequency of said first modulating wave, the phases of said further modulating waves varying with bearing about said source at a fixed range therefrom, an omni-directional antenna located on said mobile craft, means coupled with said antenna for receiving said carriers and for detecting said modulating waves transmitted by at least one of said radio beacons, means for transmitting pulses from said mobile craft to said one of said radio beacons simultaneously with receipt of transmissions from said one of said radio beacons, means for returning to said mobile craft echo pulses from said one of said radio beacons in response to transmission of said pulses to said one of said radio beacons, means aboard said aircraft for receiving and detecting said echo pulses, means for amplifying said modulations of said further modulated carriers, means for controlling the gain of said means for amplifying in accordance with the time interval between transmission of a pulse and of reception of a corresponding echo pulse by said means for receiving and detecting said echo pulses, and means for indicating in response to signals derived from said means for amplifying and from said means for receiving pulses the ranges and bearings of said mobile craft from said at least one of said radio beacons.

2. The combination in accordance with claim 1, wherein said means for indicating comprises a cathode ray tube indicator having a cathode ray beam and a screen for providing an image in response to impact by said cathode ray beam, means responsive to said modulations of said further modulated carriers for determining the angular position of said beam with respect to said screen, and means responsive to the gain of said means for amplifying for determining the radial position of said beam with respect to said screen.

3. In a system of radio navigation for mobile craft, a plurality of similar radio beacons, means for causing said radio beacons to transmit periodically in time succession at a rate of at least ten times per second at each radio beacon three signals each modulated with a modulating wave at the same frequency, a first of said three signals comprising a carrier wave and two side bands, the phase of said modulating wave comprised in said first of said three signals having equal phase omni-directionally from its source, the modulating waves comprised in the remaining two signals having phases variable equally and oppositely with azimuthal angle from their sources, an omni-directional antenna mounted on said mobile craft, means coupled with said omni-directional antenna for amplifying and demodulating each group of three signals deriving from each of said radio beacons in succession for deriving from each of said groups a voltage having the form $-B \cos \Omega t$ and two further voltages having the forms respectively $A \cos (\Omega t+\varphi) (-\Omega t)$ and $-A \cos (\Omega t-\varphi) (-\Omega t)$, $\Omega$ being the modulation frequency, and $\varphi$ the variable phase of the modulation, A and B being constants, a cathode ray tube indicator comprising means for generating an electron beam, means for deflecting said electron beam through said angle $\varphi$ in response to said further voltages, means for emitting pulses periodically from said mobile craft at times coinciding with reception of signals from at least one of said radio beacons, means for repeating said pulses to said mobile craft from said at least one of said radio beacons, means at said mobile craft for receiving said repeated pulses, means at said mobile craft for amplifying said modulations with a gain which is a function of the time interval separating transmission and reception of said pulses aboard said mobile craft, and means for determining the amplitude of deflection of said electron beam in the direction of said angle $\varphi$ in accordance with the magnitude of said gain.

4. In a system of radio navigation for mobile craft, a plurality of radio beacons at fixed locations and of identical arrangement, means for effecting periodic transmissions from said radio beacons in a predetermined relative order, at the rate of at least forty transmissions per radio beacon per second, each of said transmissions comprising three waves of slightly different wave length, each modulated in amplitude at the same frequency $\Omega$, each of said radio beacons comprising a central vertical antenna located on the vertical axis of a square-based prism of which the four vertical sides are constituted of four antennas for providing directional patterns to the North, South, East, and West of said central vertical antenna, the distances between said antennas being small relative to the wave lengths of said transmissions, said central vertical antenna emitting a first wave comprising a carrier and two side bands such that the upper side band when combined with the upper side band of the waves emitted by said four antennas provides a resultant radiation pattern rotating at the angular velocity and $\Omega$, and such that the lower side band when combined with the lower side bands of the waves emitted by said four antennas provides a resultant rotational pattern of radiation rotating at the angular velocity $-\Omega$. means aboard said aircraft for receiving and detecting said three waves, said last named means comprising an omni-directional antenna, an amplifier coupled with said antenna and having an output circuit, three filters connected with said output circuit for separating said omni-directional carrier from said side bands and said side bands from each other, each of said filters having an output circuit, a detector connected with each of said last named output circuits, two limiter stages connected at the output circuits of said filters for separating said side bands from each other, a cathode ray oscilloscope having an intensity control grid, means for connecting said intensity control grid to the output circuit of said filter circuit for separating said carrier from said side bands, two pairs of deflection electrodes for said cathode ray tube indicator, means for connecting said limiter stages to said two pairs of deflection electrodes to deflect said cathode ray beam angularly across said screen in accordance with the azimuthal bearing of said mobile craft from said at least one radio beacon, an airborne pulse transmitter having a pulse repetition rate different from the rate of transmissions from said at least one beacon, or from an integral multiple of said rate, a time base voltage generator for generating a time base voltage, means for applying said time base voltage to said limiters to control the limiting amplitude thereof, means for applying said time base voltage to said amplifier for controlling the gain thereof, means for effecting re-transmission from said central vertical antenna of each of said radio beacons to said mobile craft of said pulses transmitted by said pulse transmitter, and means aboard said aircraft responsive to said repeated pulses for initiating a visible indication on said cathode ray oscilloscope.

5. In a system of radio navigation for mobile craft, a plurality of similar fixed radio beacons for emitting signals periodically in a predetermined relative order, each of said signals comprising two waves modulated in amplitude at the same frequency, each of said waves comprising a carrier and two side bands, the first of said waves having equal phase omni-directionally at any fixed distance from its source, the other of said waves having a phase variable with azimuthal bearing from said source at any fixed distance from said source, an omni-directional antenna on said mobile craft, means coupled with said antenna for amplifying, separating and detecting said two waves to provide two detected outputs, a phase shifting means, means for connecting said phase shifting means in cascade with one of said means for demodulating for phase shifting one of said detecting outputs, means comprising two leads for deriving phase shifted signals from said phase shifting means, means for grounding one of said leads, a variable gain amplifier for amplifying the other of said detected outputs, said variable gain amplifier comprising a vacuum tube having a gain control grid, and means for connecting the other of said leads to said gain control grid to control the gain of said gain control amplifier.

6. The combination in accordance with claim 5 wherein is further provided a pulse transmitter having an input circuit and an output circuit, means for connecting said output circuit between ground and one of said output leads of said phase shifting means, means for pulsing said pulse transmitter at the periodicity of one of said radio beacons, a low frequency detector having an input circuit and an output circuit, means connecting the input circuit of said detector to receive said one of said detected outputs, and means for connecting said output circuit of said low frequency detector to the input circuit of said pulse transmitter.

7. In a system of radio navigation for aircraft, a plurality of radio beacons each located at a fixed geographic location, said radio beacons comprising means for transmitting on the same carrier frequency from each of said radio beacons in succession a radiation pattern comprising a component variable azimuthally from the transmitting radio beacon and a further component invariable azimuthally with respect to the transmitting radio beacon, means aboard said aircraft for deriving signals from said radiation patterns, said signals as received having magnitudes representative of the azimuthal bearings of said aircraft with respect to said radio beacons, means aboard said aircraft for selecting signals deriving from one of said radio beacons to the exclusion of the remainder of said radio beacons, and means responsive to said selected signals for creating an indication of the bearing of said aircraft with respect to said one of said radio beacons.

8. In a system of radio navigation for aircraft a radio beacon for transmitting into space a radiation pattern comprising a first carrier at a first radio frequency modulated in amplitude at a first modulation frequency, said modulation frequency having equal phase in all directions azimuthally from said radio beacons, said radiation pattern further comprising a second and a third radio frequency carrier at second and third radio frequencies respectively, said second and third carriers being modulated by relatively phase displaced modulation frequencies identical with said first modulation frequency, said second and third modulation frequencies having phases varying in opposite directions for increasing azimuthal bearings with respect to said radio beacon, means aboard said aircraft for receiving said first, second and third frequencies and for deriving therefrom the modulations thereon, and means responsive to the relative phases of said modulations as received aboard said aircraft for providing an indication of the bearing of said aircraft with respect to said radio beacon.

HENRI CHIREIX.

(References on following page)

REFERENCES CITED

The following references are of record in the file of this patent:

UNITED STATES PATENTS

| Number | Name | Date |
|---|---|---|
| 2,252,699 | Byrne | Aug. 19, 1941 |
| 2,253,958 | Luck | Aug. 26, 1941 |
| 2,313,048 | Byrne | Mar. 9, 1943 |
| 2,377,902 | Relson | June 12, 1945 |
| 2,400,641 | Hardy | May 21, 1946 |
| 2,404,196 | Seeley | July 16, 1946 |
| 2,413,637 | Loughlin | Dec. 31, 1946 |
| 2,444,452 | Labin | July 6, 1948 |
| 2,448,016 | Busignies | Aug. 31, 1948 |
| 2,468,045 | Deloraine | Apr. 26, 1949 |